Dec. 7, 1926.

J. F. JOHNSON

ROTOR CONSTRUCTION

Filed Dec. 6, 1922

1,610,010

J. F. Johnson
INVENTOR

BY *J C Davis*
ATTORNEY

Patented Dec. 7, 1926.

1,610,010

UNITED STATES PATENT OFFICE.

JOSIAH F. JOHNSON, OF SWARTHMORE, PENNSYLVANIA, ASSIGNOR TO WESTINGHOUSE ELECTRIC AND MANUFACTURING COMPANY, A CORPORATION OF PENNSYLVANIA.

ROTOR CONSTRUCTION.

Application filed December 6, 1922. Serial No. 605,247.

My invention relates to rotating machines, such, for example, as turbines, turbo-blowers, and like apparatus, wherein close clearances are maintained between the relatively rotatable members, and has for its object to provide a rotor or shaft member with grooves or recesses for the purpose of limiting distortion thereof and, therefore, of avoiding harder rubbing of the rotor or shaft against the member with respect to which it has close clearance.

Figure 1:
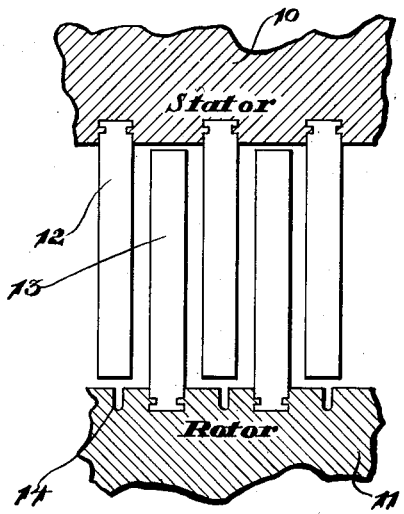
Figure 3:
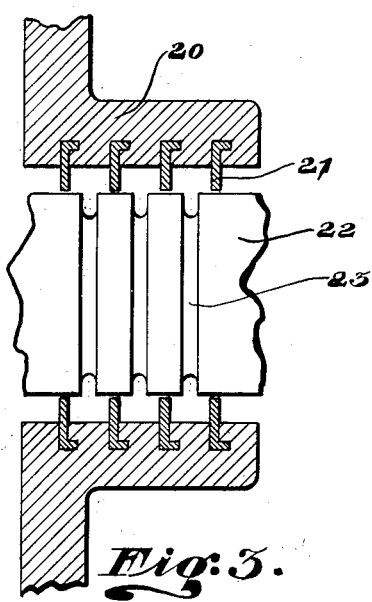
Figure 4:
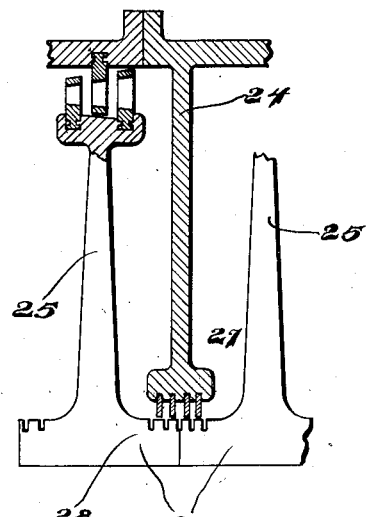

Apparatus embodying features of my invention is illustrated in the accompanying drawings, forming a part of this application, in which: Fig. 1 is a sectional detail view showing turbine blading together with a rotor which is modified in accordance with my invention to limit distortion; and Figs. 2, 3 and 4 are sectional detail views showing rotors or shafts modified in accordance with my invention to limit distortion.

The shaft or drum of apparatus such as a turbine or turbo-blower never rotates absolutely true for the reason that there is always a high spot because the machine and balance are never perfect. If the clearance between relatively rotary members is very small, the high spot may contact; and, if this takes place, local heating ensues resulting in the expansion of the metal of the rotor near the surface and distortion thereof with harder rubbing. Accordingly, it is the object of my invention to provide a rotor with recesses or grooves to limit distortion and, therefore, harder rubbing with possible consequent injury to parts such as turbine blades or packing.

Referring now to the drawings for a more detailed description of my invention, in Fig. 1, I show relatively rotary members such as a stator 10 and a rotor 11 provided, respectively, with inter-fitting rows of blades 12 and 13. Due to the fact that absolute perfection of the rotor and its balance are impossible, when the latter rotates, it may have a high spot which may contact with the tips of the stationary blades 12, as a relatively close clearance is preserved between the latter blades and the rotor. If the parts contact, local heating ensues with consequent expansion of the metal near the surface of the rotor; and, with the ordinary construction, the rotor may become so distorted as to cause harder rubbing with possible consequent injury to the blades. Therefore, I provide the rotor 11 with grooves or recesses 14 which preferably extend circumferentially and which are preferably located between the rows of moving blades 13 and adjacent to the tips of the blades 12. These grooves or recesses serve to prevent or reduce distortion of the rotor due to expansion resulting from heating consequent upon an initial rubbing of parts and also to provide increased surface for the transfer of the heat generated from the rotor to the steam or gas which leaks by the blade tips.

Figure 2:
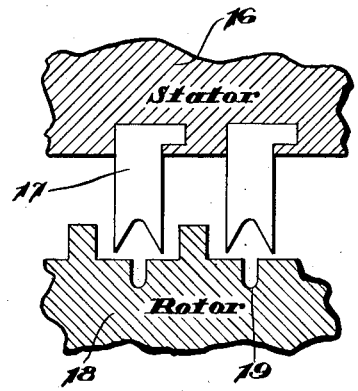

In Fig. 2, I show how my invention may be applied to packing of the labyrinth type such, for example, as that used in connection with turbine dummy rings. In this view, I show a stator 16 provided with packing members 17 having relatively close clearance with respect to a rotor element 18. The rotor is provided with grooves or recesses 19 which serve the same purpose as the grooves 14 more particularly referred to in connection with Fig. 1, that is, distortion is limited and more effective transfer to heat generated is provided for.

In Fig. 3, I show how my invention may be applied to shaft packing. In this view, the stator or casing 20 is provided with a plurality of inwardly extending packing members 21 which have relatively close clearance with respect to a rotor or shaft member 22 and the latter is provided with suitable grooves or recesses 23 to limit distortion thereof in the manner set forth.

In Fig. 4, I show how my invention may be applied to the diaphragm packing of a turbine of the multiple impulse stage type. In this view, I show a diaphragm 24 arranged between adjacent blade carrying disks 25, the latter being provided with adjoining hub portions 26 which have relatively close clearance with respect to the packing members 27 carried by the diaphragm. The hub members 26 are provided with grooves or recesses 28 to limit distortion in the manner hereinbefore set forth.

From the foregoing, it will be apparent that I have devised means whereby distortion of a rotary member may be limited and consequent harder rubbing thereof against a member with respect to which it has close clearance may be avoided.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In apparatus of the character described, the combination of relatively rotatable members, one of said members being provided with projections lying without the adjacent surface of the other member and having a close radial clearance with respect thereto engendering rubbing under abnormal conditions between the members and local heating thereof, the other of said members being provided with a groove or grooves adjacent the areas liable to rubbing to allow for its expansion due to local heating so as to limit or avoid distortion thereof and to provide increased surface for the transfer of heat generated.

2. In apparatus of the character described, the combination of relatively rotatable members, one of said members being provided with projections lying without the adjacent surface of the other member and having a close radial clearance with respect thereto engendering rubbing under abnormal conditions between the members and local heating thereof, the other of said members being provided with one or more circumferential cooling grooves adjacent the areas liable to rubbing to limit its distortion due to expansion.

3. In apparatus of the character described, the combination of a stator, a rotor, a plurality of inwardly projecting elements carried by the stator lying without the adjacent peripheral surface of the rotor and having a close radial clearance with respect thereto engendering rubbing under abnormal conditions between the projecting elements and the peripheral surface of the rotor and local heating thereof, said rotor being provided with a cooling groove or grooves in said peripheral surface opposed to said inwardly projecting elements.

4. In a turbine, the combination of a stator, a rotor, a plurality of rows of blades carried by the stator, the tips of said blades lying without the adjacent surface of the rotor and having a close radial clearance with respect thereto whereby the blades and the rotor are subject to rubbing and local heating under abnormal conditions, said rotor being provided with grooves or recesses opposite the blades to limit distortion of the rotor due to superficial expansion and to provide for the more effective transfer of heat generated.

In testimony whereof, I have hereunto subscribed my name this 29th day of November 1922.

JOSIAH F. JOHNSON